(12) United States Patent
Rofe et al.

(10) Patent No.: US 11,892,363 B2
(45) Date of Patent: Feb. 6, 2024

(54) ANTI-CRINKLING PRESSURE SENSING MAT

(71) Applicant: Wellsense, Inc., Birmingham, MI (US)

(72) Inventors: Arik Rofe, Ma'ale HaHamisha (IL); Oola Greenwald, Mevasseret Zion (IL); Roman S. Ferber, Birmingham, MI (US); Asaf Brosch, Rosh Tzurim (IL)

(73) Assignee: Wellsense, Inc., Birmingham, MI (US)

( * ) Notice: Subject to any disclaimer, the term of this patent is extended or adjusted under 35 U.S.C. 154(b) by 69 days.

(21) Appl. No.: 17/571,981

(22) Filed: Jan. 10, 2022

(65) Prior Publication Data
US 2023/0221193 A1 Jul. 13, 2023

(51) Int. Cl.
*G01L 1/20* (2006.01)
(52) U.S. Cl.
CPC .................................. *G01L 1/205* (2013.01)
(58) Field of Classification Search
None
See application file for complete search history.

(56) References Cited

U.S. PATENT DOCUMENTS

| | | | |
|---|---|---|---|
| 7,695,597 B1 * | 4/2010 | Drewery | C25F 7/00 204/194 |
| 8,161,826 B1 * | 4/2012 | Taylor | A47C 27/082 73/862.041 |
| 9,823,141 B2 * | 11/2017 | Li | G01L 1/146 |
| 10,386,224 B2 | 8/2019 | Shim et al. | |
| 10,416,031 B2 | 9/2019 | Hsu et al. | |
| 10,856,737 B2 | 12/2020 | Au et al. | |

(Continued)

FOREIGN PATENT DOCUMENTS

| | | | |
|---|---|---|---|
| CN | 213641864 U | | 7/2021 |
| WO | WO2020172662 | * | 8/2020 |

(Continued)

OTHER PUBLICATIONS

NPL search (Mar. 23, 2023).
International Search Report issued in PCT/US2023/010490, dated May 1, 2023, 4 pages.

*Primary Examiner* — Brandi N Hopkins
*Assistant Examiner* — Nigel H Plumb
(74) *Attorney, Agent, or Firm* — Brooks Kushman P.C.

(57) ABSTRACT

A pressure sensing mat including a first conductive layer, a second conductive layer, and an insulative layer disposed therebetween. The first conductive layer includes a first plurality of spaced apart conductive paths and a first plurality of non-conductive paths therebetween and defining a plurality of gaps in the first plurality of non-conductive paths having a first repeating pattern of a cross shape. The first plurality of spaced apart conductive paths and the first plurality of non-conductive paths extend in a first direction. The second conductive layer includes a second plurality of spaced apart conductive paths and a second plurality of non-conductive paths therebetween and defining a second plurality of gaps in the second plurality of non-conductive paths having a second repeating pattern. The second plurality of spaced apart conductive paths and the second plurality of non-conductive paths extends in a second direction different than the first direction.

17 Claims, 9 Drawing Sheets

(56) References Cited

U.S. PATENT DOCUMENTS

| | | |
|---|---|---|
| 2002/0143373 A1 | 10/2002 | Courtnage et al. |
| 2006/0213286 A1* | 9/2006 | Chasco Perez De Arenaza ......... A61G 7/057 73/862.041 |
| 2008/0265393 A1 | 10/2008 | Lin et al. |
| 2014/0373594 A1 | 12/2014 | Remez et al. |
| 2016/0327441 A1 | 11/2016 | Iwase et al. |
| 2019/0137322 A1* | 5/2019 | Choi ..................... G01L 9/08 |
| 2019/0197865 A1* | 6/2019 | Lu ..................... G08B 21/0461 |

FOREIGN PATENT DOCUMENTS

| | | |
|---|---|---|
| WO | 2021071370 A1 | 4/2021 |
| WO | 2020172662 A1 | 9/2021 |

* cited by examiner

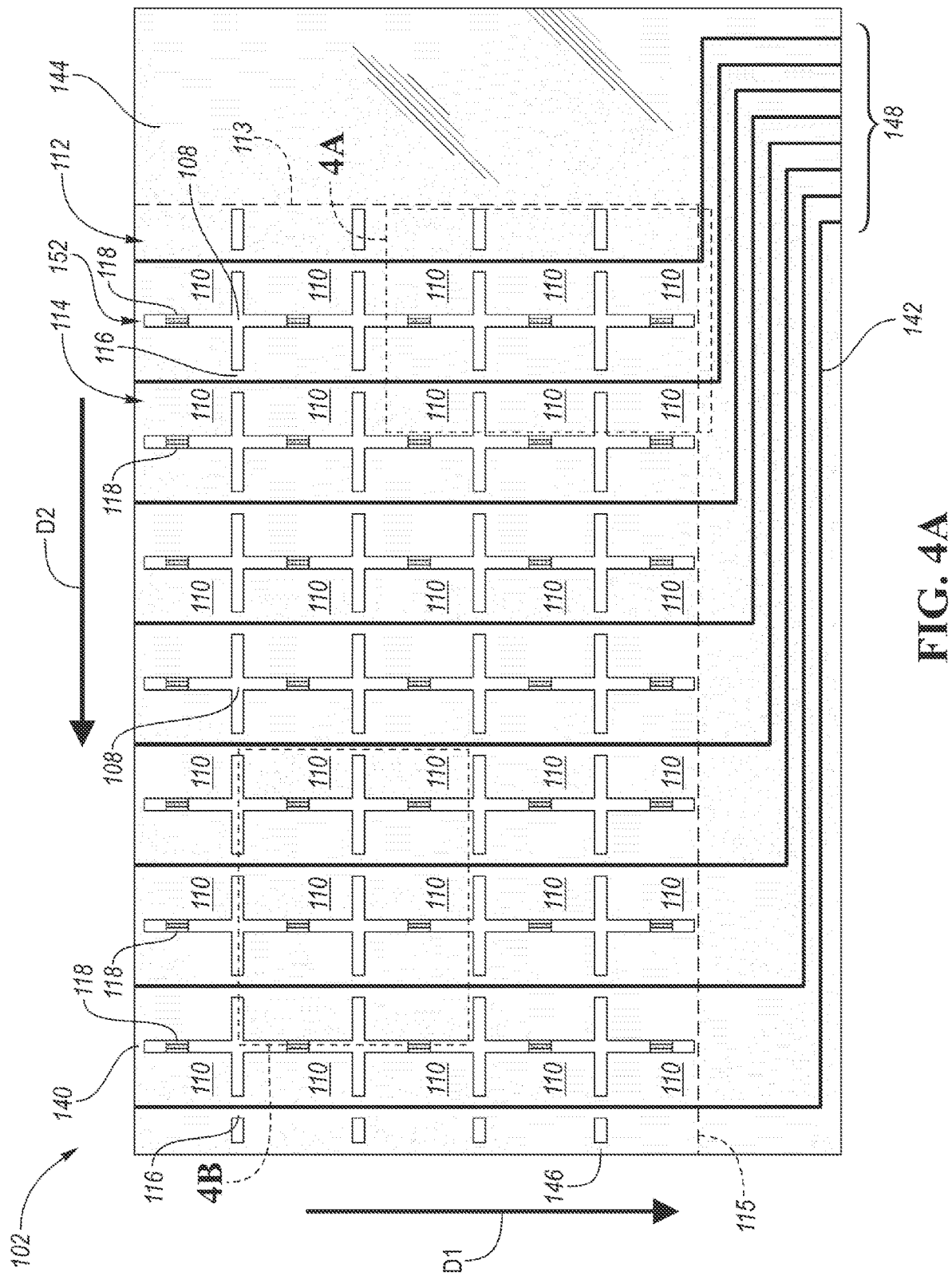

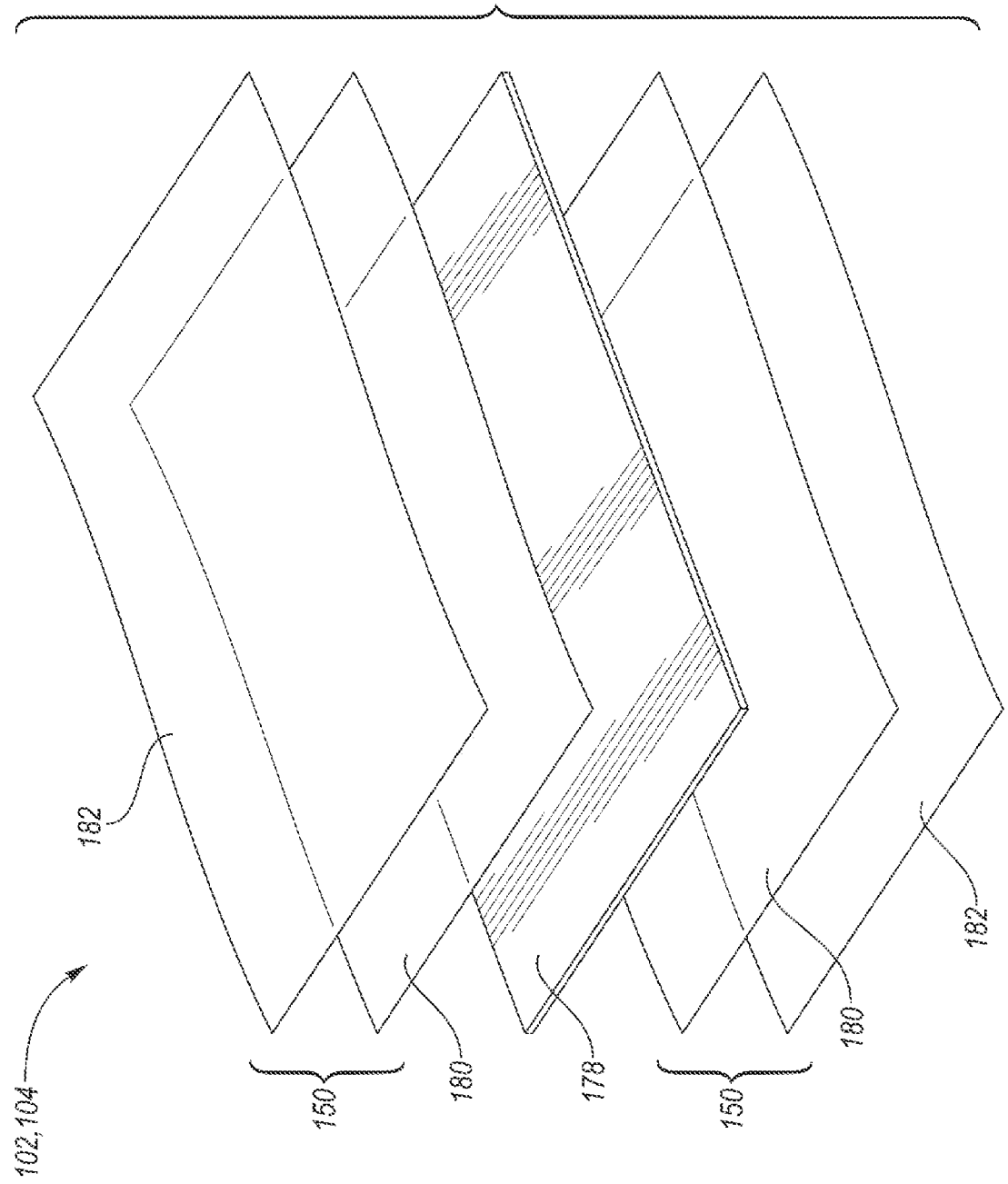

_US 11,892,363 B2_

ANTI-CRINKLING PRESSURE SENSING MAT

TECHNICAL FIELD

Aspects of the disclosure generally relate to a pressure sensing mat configured to aid in the mitigation of pressure injuries, otherwise known as decubitus ulcers.

BACKGROUND

Pressure injuries, otherwise known as decubitus ulcers, pressure ulcers or bedsores, are lesions developed when a localized area of soft tissue of a subject is compressed between a bony prominence and an external surface for a prolonged time. Pressure injuries could appear in various areas of the body, such as elbows, knees, pelvis, lower back, and ankles. Development of pressure injuries are based on a combination of factors, such as, unrelieved pressure, friction, shearing forces, humidity, and temperature.

Patients lying in hospital beds and other surfaces often suffer from pressure injuries. Pressure injuries are a risk for patients in different hospital departments. For instance, pressure injuries may be an issue for patients lying on an operating table during an operation. Patients lying in hospital beds in other departments (e.g., intensive care unit, neo natal care unit, step down units, etc.) are also prone to pressure injuries. However, pressure injuries are not limited to hospitalized patients. Individuals confined to wheelchairs are prone to suffer from pressure injuries, especially in their pelvis, lower back, and ankles. Nursing and rehabilitation home residents also can suffer from pressure injuries. Therefore, there is a relatively large number of settings within the hospital and in other environments where individuals may encounter problems with pressure injuries.

Although easily preventable or treatable if found early, if a pressure injury lingers, it becomes painful and treatment is both difficult and expensive. In many cases, pressure injuries can prove fatal, even under the auspices of medical care. According to one estimate, 2.5 million people suffer from pressure injuries in the United States each year, resulting in over 60,000 deaths annually. Pressure sensing mats have been utilized in hospital bed settings to aid in the mitigation of pressure injuries. The pressure sensing mats use capacitive or resistive sensors to track the pressure exerted on different regions of the body of a patient lying in the hospital bed.

SUMMARY

According to one embodiment, a pressure sensing mat is disclosed. The pressure sensing mat may include a first conductive layer, a second conductive layer, and an insulative layer disposed therebetween. The first conductive layer may include a first plurality of spaced apart conductive paths and a first plurality of non-conductive paths therebetween. The first plurality of spaced apart conductive paths and the first plurality of non-conductive paths extend in a first direction. The second conductive layer may include a second plurality of spaced apart conductive paths and a second plurality of non-conductive paths therebetween. The second plurality of spaced apart conductive paths and the second plurality of non-conductive paths extend in a second direction different than the first direction.

The first conductive layer may define a first plurality of gaps located in the first plurality of non-conductive paths. The second conductive layer may define a second plurality of gaps in the second plurality of non-conductive paths.

The first plurality of gaps partially may define a first profile of each of the first plurality of conductive paths. The second plurality of gaps may at least partially define a second profile of each of the second plurality of conductive paths.

The first plurality of gaps may have a first repeating pattern, and the second plurality of gaps may have a second repeating pattern. The first and second repeating patterns may be the same repeating pattern. In one or more embodiments, the first repeating pattern may be a cross shape.

The first conductive layer may include a first non-conductive sheet and a first conductive sheet that may lie along the first non-conductive sheet. The first conductive sheet may include a plurality of non-conductive regions and a plurality of conductive regions. The first non-conductive sheet may physically connect the plurality of non-conductive regions to the plurality of conductive regions.

According to another embodiment, a pressure sensing mat is disclosed. The pressure sensing mat may include a first conductive layer, a second conductive layer, an insulative layer disposed therebetween. The first conductive layer may define a first plurality of interstices that may form a first array of conductive cells, a first plurality of connecting members, and a second plurality of connecting members. The first array of conductive cells may be arranged to form portions of a first conductive path and a second conductive path that may each extend in a first direction. The first plurality of connecting members may extend in the first direction and may collectively form, with the first array of conductive cells, the first conductive path and the second conductive path. The second plurality of connecting members may extend in a second direction and may be disposed between the conductive cells of the first conductive path and the conductive cells of the second conductive path. The second plurality of connecting members may be configured to electrically disconnect the conductive cells of the first conductive path and the conductive cells of the second conductive path. The second conductive layer may define a second plurality of interstices that may form a second plurality of connecting members, a third plurality of connecting members, and a fourth plurality of connecting members. The second array of conductive cells may be arranged to form portions of a third conductive path and a fourth conductive path that may each extend in the second direction. The third plurality of connecting members may extend in the second direction. The third plurality of connecting members and second array of conductive cells may collectively form the third conductive path and the fourth conductive path. The fourth plurality of connecting members may extend in the first direction and may be disposed between the conductive cells of the third conductive path and the conductive cells of the fourth conductive path. The fourth plurality of connecting members may be configured to electrically disconnect the conductive cells of the third conductive path and the conductive cells of the fourth conductive path.

The first array of conductive cells, the first plurality of connecting members, and the second plurality of connecting members may each be formed of a conductive material and at least 75% of a first area of the first conductive layer may be composed of the conductive material. In one or more embodiments, at least 25% of the first area may be composed of the first plurality of interstices.

The first plurality of interstices and the second plurality of interstices may be substantially aligned with one another.

A first conductive cell of the first array of conductive cells may have a first width and a first connecting member of the first plurality of connecting members may have a second width and the second width may be less than the first width. A first connecting member of the second plurality of connecting members may have a third width and the third width may be substantially equal to the second width.

The second plurality of connecting members may include a first plurality of discontinuities to electrically disconnect the conductive cells of the first conductive path and the conductive cells of the second conductive path. The fourth plurality of connecting members may include a second plurality of discontinuities to electrically disconnect the conductive cells of the third conductive path and the conductive cells of the fourth conductive path.

The second plurality of connecting members may have a first thickness and the first plurality of discontinuities may have a second thickness and the second thickness may be less than the first thickness. The first plurality of discontinuities may be formed by melting or ablating at least a portion of the first plurality of discontinuities. As another example, the first plurality of discontinuities may be formed by etching at least a portion of the first plurality of discontinuities.

BRIEF DESCRIPTION OF THE DRAWINGS

FIG. 4A depicts a schematic view of a portion of an exemplary pressure sensing mat.

FIG. 6 depicts a fragmented, exploded, and perspective schematic view of a portion of an exemplary pressure sensing mat.

DETAILED DESCRIPTION

Figure 1:
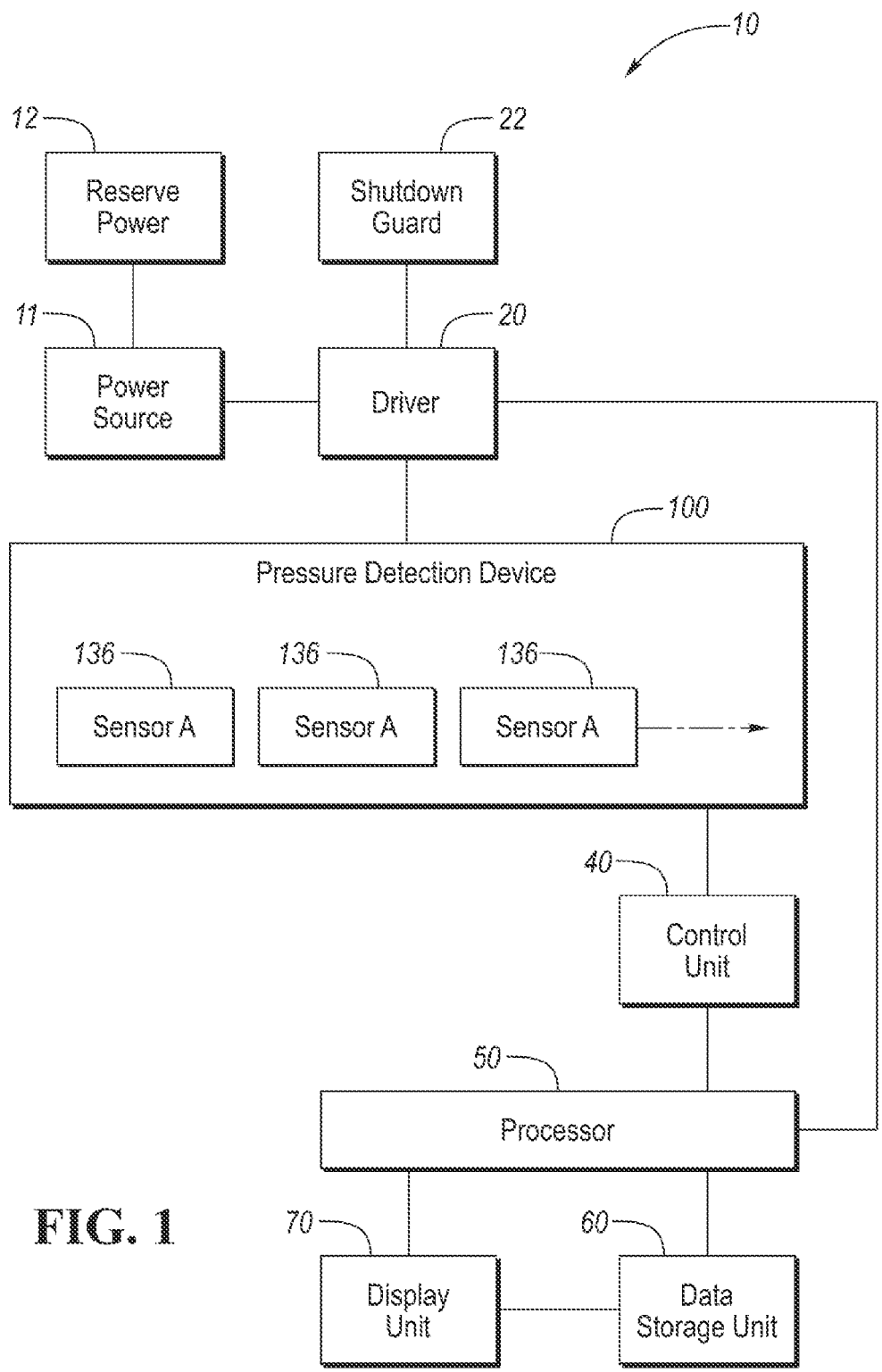
FIG. 1 is a schematic of the main components of a pressure sensing mat and related components of at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

Aspects of the disclosure generally relate to a capacitive pressure sensing mat configured to aid in the mitigation of pressure injuries. Other capacitive pressure sensing mats have been proposed. In one previous implementation, the pressure mat is composed of a matrix of knitted conductive fabric spaced apart by an insulator and connected by a woven ribbon to form a plurality of electrical capacitors. The knitted conductive fabric matrix is produced by standard processes associated with textile manufacturing. The material and manufacturing processes for these knitted conductive fabric pressure sensing mats may be costly thus requiring them to be reused several times to make their use economically feasible. Reusing the pressure mat may require the mat to be cleaned and sanitized after each use and may create sanitation issues of the mat is not sufficiently cleaned or sanitized between patients. Also, these knitted conductive fabric pressure sensing mats are specially designed and manufactured for different operating environments, e.g., intensive care units, operating rooms, nursing homes, wheelchairs. Therefore, in some instances, these pressure sensing mats may not be suitable as a modular solution.

Pressure mats composed of knitted fabric often involve individual calibration for accuracy and precision. Knitted fabrics include conductive threads or yarns that are relatively elastic and deformable. Available pressure mats are calibrated before use. During the calibration process, the capacitance of each sensor in the matrix is measured for one or more known pressures. The functional relationship between the known pressures and measured capacitance at each sensor is used to calibrate each sensor. Geometrical tolerances of knitted fabrics may have a relatively large range, e.g., 0.5 mm to 1.5 mm, thereby adding variability to the capacitance measurements.

The capacitive pressure sensing mat of the present disclosure may be formed of spaced apart laminated conductive sheets. The geometrical tolerances of the laminated conductive sheets may have relatively smaller range, e.g., 0.5 microns to 2 microns, than the knitted fabric matrix. Because the laminated conductive sheets have a narrower tolerance band as compared to pressure mats composed of knitted fabrics, calibration may be streamlined relative to sensing mats composed of knitted fabrics. In some instances, the use of laminated conductive sheets may obviate the need to calibrate every pressure mat before each pressure mat is used. As one example, a statistical analysis for a predetermined number of pressure mats may be used to determine the required frequency of calibrating the pressure mats composed of laminated conductive sheets. Decreasing the frequency and quantity of calibration processes may create efficiencies in manufacturing and may reduce costs.

One or more of the capacitive pressure sensing mats of the present disclosure may include relatively inelastic material such as laminated conductive sheets that may mitigate relative movement between two or more layers and two or more sensors of the sheet as compared to known pressure mats composed of knitted fabrics. The knitted fabrics over time may begin to elongate and such elongation may reduce the useful life of the pressure mat. The relatively inelastic material of the pressure mat of the present disclosure may last longer by avoiding this potential issue.

Pressure mats composed sheets or layers formed of metallic alloys may be susceptible to folding or crinkling. Similar to the crinkling of a bag of potato chips, caused by folding and crinkling of a potato chip bag formed of metallic foil, the conductive layers of some pressure mats may fold and crinkle which may result in unwanted noise as the occupant moves while lying on the pressure mat. This unwanted noise may disturb or wake the user, for example, when the user adjusts his or her position on the pressure mat.

Available pressure sensing mats are typically plugged into a power source and connected to a computer or controller to collect the measured data. One or more of the capacitive pressure sensing mats of the present disclosure may be configured for wireless power and communication. The capacitive pressure sensing mats of the present disclosure may be capable of communicating with a wireless network and powered by a rechargeable battery. The capacitive pressure sensing mats of the present disclosure may be configured to be disposable for use in the operating room. The pressure sensing mats of the present disclosure may be adaptable to a modular manufacturing method where the laminated sheet material may be cut to different sizes from the same stock material so that the laminated conductive sheets can be applied to many different use cases and settings.

The pressure sensing mats disclosed in embodiments of the present disclosure provides one or more technical solutions to one or more of the technical drawbacks of the currently proposed pressure sensing mats.

Referring generally to the figures, a pressure sensor mat 100 is provided. The pressure sensor mat 100 may include a first conductive layer 102, a second conductive layer 104, and an insulative layer 106 that may be disposed between the first and second conductive layers 102 and 104. The first conductive layer 102 may define first interstices 108 forming a first array of conductive cells 110 arranged to at least partially form a number of conductive paths such as a first conductive path 112 and a second conductive path 114. The first and second conductive paths 112 and 114 may extend in a first direction D1.

The first interstices 108 may form first connecting members 116 and second connecting members 118. The first connecting members 116 may extend in the first direction D1. The first connecting members 116 may extend between each of the conductive cells 110 that are aligned with one another in the first direction. The first connecting members 116 may electrically and physically connect the conductive cells 110 that are aligned with one another to form the first conductive path 112 and the second conductive path 114.

The second connecting members 118 may extend in a second direction D2, which may be substantially orthogonal or form a ninety-degree angle to the first direction D1. The second connecting members 118 may extend between conductive cells 110 of the first conductive path 112 and conductive cells 110 of the second conductive path 114. In one or more embodiments, the second connecting members 118 may physically connect the first conductive path 112 and the second conductive path 114 and the second connecting members 118 may be configured to electrically disconnect the first conductive path 112 from the second conductive path 114.

The second conductive layer 120 may define second interstices 122 forming a second array of conductive cells 124 arranged to at least partially form a number of conductive paths such as a third conductive path 126 and a fourth conductive path 128. The third and fourth conductive paths 126 and 128 may extend in a second direction D2.

The second interstices 130 may form third connecting members 132 and fourth connecting members 134. The third connecting members 132 may extend in the second direction D2 and may be disposed between each of the conductive cells 124 aligned with one another in the second direction D2. The third connecting members 132 may electrically and physically connect the conductive cells 124 that are aligned with one another to form the third conductive path 126 and the fourth conductive path 128.

The fourth connecting members 134 may extend in the second direction and may be disposed extend between conductive cells 124 of the third conductive path 126 and conductive cells 124 of the fourth conductive path 128. In one or more embodiments, the fourth connecting members 134 may physically connect the third conductive path 126 and the fourth conductive path 128 and the fourth connecting members 134 may be configured to electrically disconnect the third conductive path 126 from the fourth conductive path 128.

A first array of conductive cells 110 and a second array of conductive cells 124 may be substantially aligned with one another to form a matrix or array of capacitors, e.g., a capacitor 136 that may be configured to measure capacitance indicative of a pressure applied to the capacitor 136.

The first interstices 108 and the second interstices 122 may each have a repeating pattern that may repeat along the first direction D1 and the second direction D2. The repeating pattern of the first interstices 108 may be the same as the repeating pattern of the second interstices 122. The first interstices 108 and the second interstices 122 may each have a geometric shape such as the shape of a cross or plus sign that may include a first leg and a second leg that may be orthogonal to the first leg. As an example, the first and second legs of one or more of the first and second interstices 108 and 122 may have the same length.

In one or more embodiments, the first interstices 108 may be aligned with the second interstices 122. The first and second interstices 108 and 122 may be formed by a stamping operation that may include a punch and die. The punch may have a shape that is substantially similar or congruent to the shape and size of the first and second interstices 108 and 122. As another example, the first and second interstices 108 and 122 may be formed by a cutting operation that may include using a computer numerical control (CNC) configured to cut the first and second interstices 108 and 122 in the first and second conductive layers 102 and 104. In yet another example, the interstices may be formed by ablating or melting portions of the first and second conductive layers 102 and 104 by a laser.

The second connecting members 118 and the fourth connecting members 134 may each be configured to physically connect and electrically disconnect one or more conductive paths 112, 114, 126 and 128 to one another and from one another. In one or more embodiments, the second connecting members 118 and the fourth connecting members 134 may include a one or more second discontinuities 138 that may be configured to prevent or mitigate electrical current flowing between the first conductive path 112 and the second conductive path 114, or electrical current flowing between the third conductive path 126 and the fourth conductive path 128.

The first and second interstices 108 and 122 may create bend points in the first and second conductive layers 102 and 104. The bend points may be formed by the connecting members 116, 118, 126 and 128 so that each conductive cell 110 and 124 may be separated by a bend point. Separating the conductive cells 110 and 124 by the bend points may prevent one or more conductive cells 110 and 124 from folding in on each other, contacting and generating a crinkling noise.

Referring to the block diagram of FIG. 1, an embodiment of a pressure sensing may system 10 is depicted. The system 10 may include pressure sensing mat 100 including a plurality of sensors such as capacitors 136, a driver 20, a control unit 40 which may be connected to a power source 11, a processor 50, a data storage unit 60 and a display unit 70. Power may be supplied via a power cord connected to a wall outlet, or via battery power, optionally rechargeable. Battery support also allows for movement of the bed without requiring a powering off of the system 10. As a safety measure and for compliance tracking, caregiver authentication may be required via a shutdown guard 22 to confirm powering off of the control unit 40, such as with entry of a caregiver's employee identification number. While the system identified in FIG. 1 is a capacitive sensor system, in other embodiments, other methods can be utilized, such as resistive or piezoresistive systems.

The capacitors 136 may be arranged at different locations on the pressure sensing mat 100. In an example, the capacitors 136 may be arranged in a two-dimensional grid across the surface of the pressure sensor mat 100. The driver 20 may be configured to supply voltage to the capacitors 136 in the pressure sensing mat 100, and the processor 50 may measure the potential across the capacitors 136, calculate impedance values for each capacitor 136, and store the data in a data storage unit 60. The stored data may be further processed, analyzed, and displayed on the display unit 70, such as a computer screen, laptop, personal digital assistant (PDA), tablet device, mobile phone screen, printed sheet, or integrated display screen. Although presented in the block diagram of FIG. 1 as separate blocks, the system 10 may optionally be integrated into a stand-alone system.

Figure 2:
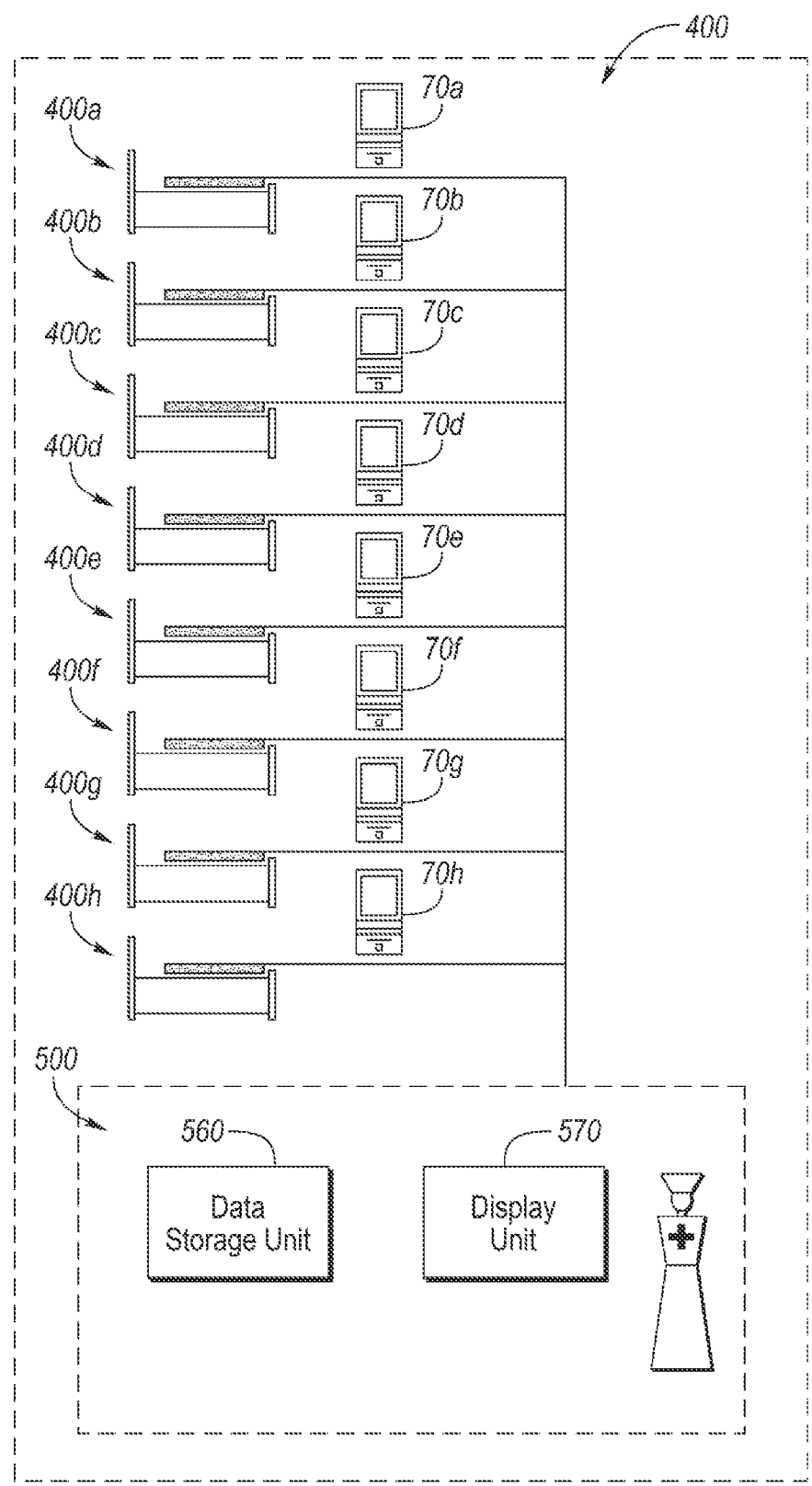
FIG. 2 is a schematic of an individual care environment according to at least one embodiment.

Referring to FIG. 2, an individual care environment 400 may include sub-systems 400a through 400h in communication with a common remote-control center 500. The individual care environment 400 may be in a hospital, nursing home, home care or rehabilitative care environment, as examples. If the individual care environment 400 is a hospital, the common remote-control center 500 may be a nursing station. As shown in FIG. 1, each of the sub-systems 400a through 400h includes a bed. The sub-systems 400a through 400h may be configured to communicate with the common remote-control center 500, for example at a nursing station. This communication can be provided via wiring to a nurse call system, or alternatively via wireless communication (e.g., BLUETOOTH, ZIGBEE, Wi-Fi, cellular, etc.) to the nursing station. Alternatively, the sub-systems 400a through 400h may be located remotely from one another, for example each in an individual home, and the common remote-control center 500 may be a manned observation station.

Figure 3:
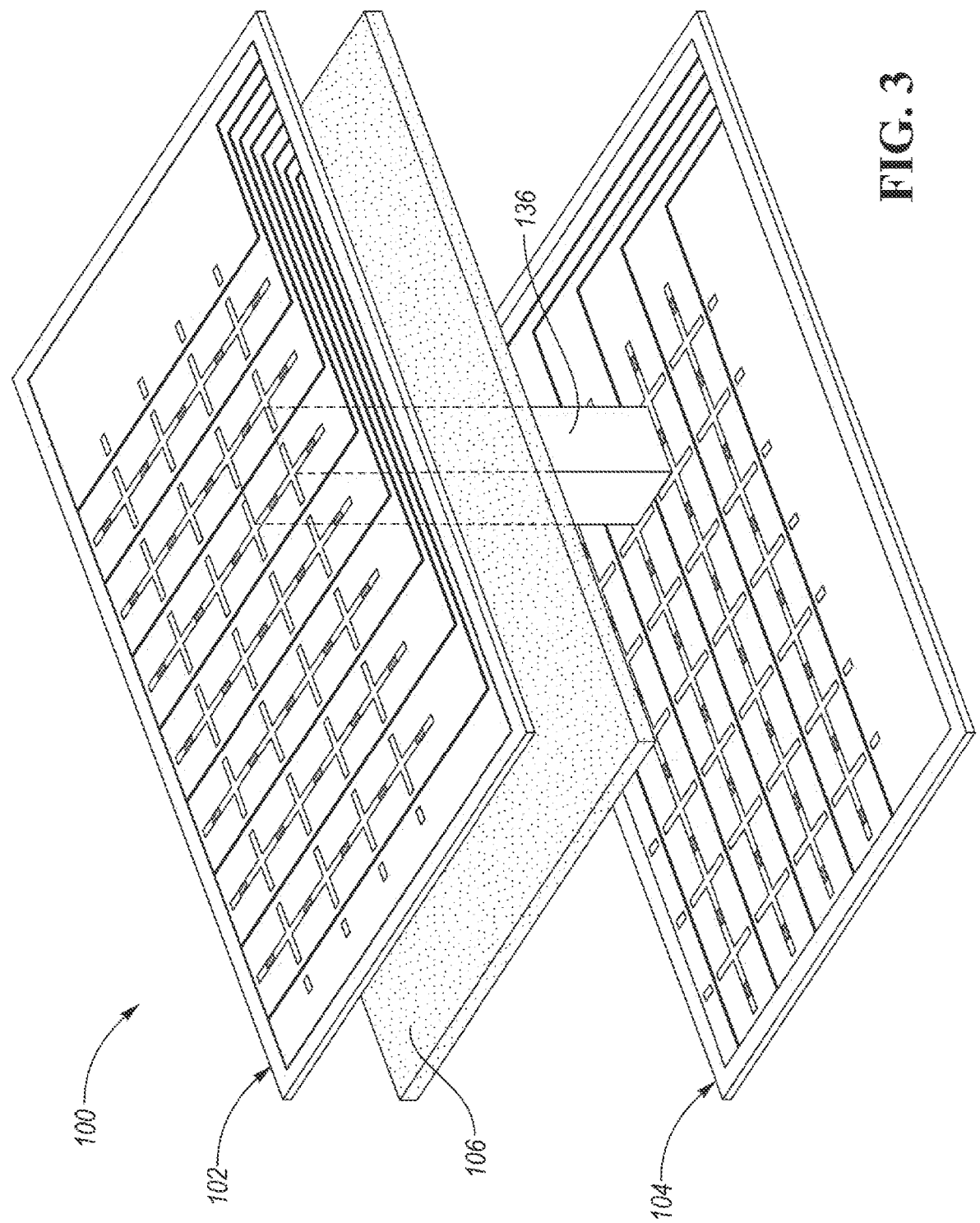
FIG. 3 depicts a fragmented, exploded, perspective, and schematic view of multiple embodiments of pressure sensing mats.

Referring to FIG. 3, portions of the pressure sensing mat 100 including the first conductive layer 102, second conductive layer 104, and the insulative layer 106 are depicted. The first conductive layer 102 is shown above the insulative layer 106 and the second conductive layer 104 is shown below the insulative layer 106. The first conductive layer 102 and the second conductive layer 104 may each be mechanically attached to the insulative layer 106 by an adhesive. As one example, a double-sided tape (DST) may be laid along either the insulative layer 106 or the first conductive layer 102, the second conductive layer 104, or both. The insulative layer 106 may then be laid on to the first and second conductive layers 102 and 104 and vice-versa. The first conductive layer 102, second conductive layer 104, and the insulative layer 106 may collectively form capacitors 136.

The first conductive layer 102 and the second conductive layer 104 may each be formed of one or more conductive metals or alloy material. As one example, the conductive layers 102 and 104 may each be formed by laminated copper material, such as 150 nm copper laminated. The laminated copper material may have a thickness ranging between 25 microns and 75 microns. As one example, Table 1 provides material properties of the 150 nm copper laminated material. In one or more embodiments, the first and second conductive layers 102 and 104 may each be formed of or include silver, aluminum, or other suitable conductive materials.

TABLE 1

| No | Criterion | Test method | Specification | Unit |
|---|---|---|---|---|
| 1 | Thickness | ISO4593 | 49 ± 8 | μ |
| 2 | Tensile Strength | ASTM D-882 | MD: 80 ± 52<br>TD: 70 ± 52 | N |
| 3 | Puncture Resistance | FTMS 101C 2065 | >40 | N |
| 4 | Lamination strength | ASTM D-882 | >300 | gr/Inch |
| 5 | Metal adhesion | Tape test with 3M 610 tape, HCTP 13 | No metal removal | |
| 6 | Copper thickness | | 150 ± 40 | nm |
| 7 | Surface Resistivity | | 0.07-0.21 | Ω/m |

As will be described in greater detail below, first conductive layer 102 and the second conductive layer 104 may each include one or more plastic laminations 150 (FIG. 6) or layers that may lie along the conductive metal or alloy material. For clarity, the plastic lamination is not shown in FIGS. 3 through 5C.

As one example, the insulative layer 106 may be formed by a non-conductive material. In other words, the material of the insulative layer 106 may not allow a flow of charge such as electrical current through or across the insulative layer 106. The non-conductive material may be film comprised of a thermoplastic polyurethane (TPU), polyethylene terephthalate (PET), foam or other suitable material.

FIG. 4A depicts a plan view of the first conductive layer 102. The first conductive layer 102 may include a first edge portion 140 and a second edge portion 142 that may each extend in the second direction. A pair of edge portions, such as a third edge portion 144 and a fourth edge portion 146 may each extend between the first and second edge portions 140, 142. Conductive leads 148 may extend from the second edge portion 142 through the conductive cells 110 to the first edge portion 140. The conductive leads 148 may provide electricity to the conductive cells 110. End portions of the conductive leads 148 may be disposed at an outer periphery of the first conductive layer 102 so that the end portions may be connected, e.g., soldered to a connector (not illustrated).

Each of the edge portions 140 through 144 may connect conductive cells 110 that are adjacent to respective edge portions. As an example, the second edge portion 142 and the third edge portion 144 may each have a larger surface area than either of the first edge portion or the fourth edge portion 146. The first conductive path 112 may include the conductive cells 110 adjacent to the third edge portion 144 and aligned with respect to the first direction D1. The second conductive path 114 may include the conductive cells 110 adjacent to the first conductive path 112. Dashed lines 113 and 115 may represent edges of the conductive cells 110.

The first connecting members 116 may extend in a direction parallel to portions of the conductive leads 148, e.g., in the first direction D1 so that the first connecting members 116 are each disposed between two conductive cells 110. The first connecting members 116 may physically and electrically connect two adjacent one of conductive cells 110 to form a number of conductive paths such as the first conductive path 112 and the second conductive path 114. The second connecting members 118 may extend in a direction that may be substantially transverse to portions of the conductive leads 148, e.g., in the second direction D2. The second connecting members may include one or more second discontinuities 138 (FIG. 4B) that may prevent electricity from flowing in the second direction D2 between the conductive paths, e.g., the first and second conductive paths 112 and 114.

The first interstices 108 are represented by the white spaces disposed between the conductive cells 110 and may form first non-conductive paths 152. As shown, the first interstices 108 may have a cross shape and may be arranged to form a repeating pattern between the first and second edge portions 140 and 142.

Figure 4C:
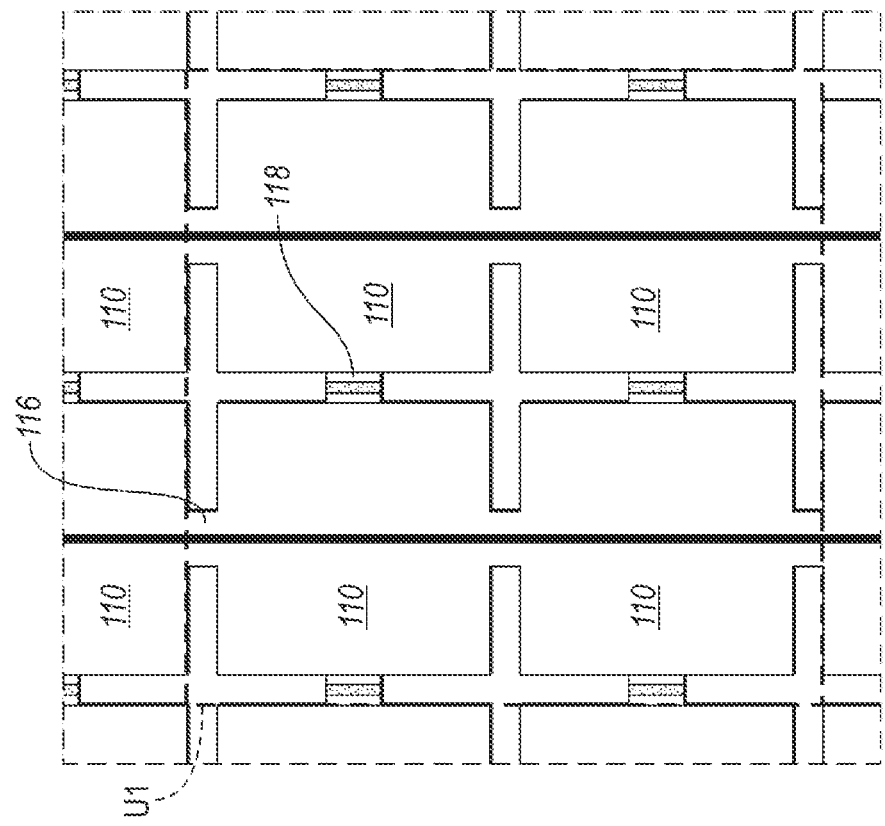
FIGS. 4B and 4C depict detailed schematic views taken from dotted regions 4A and 4B in FIG. 4A, respectively.
Figure 4B:
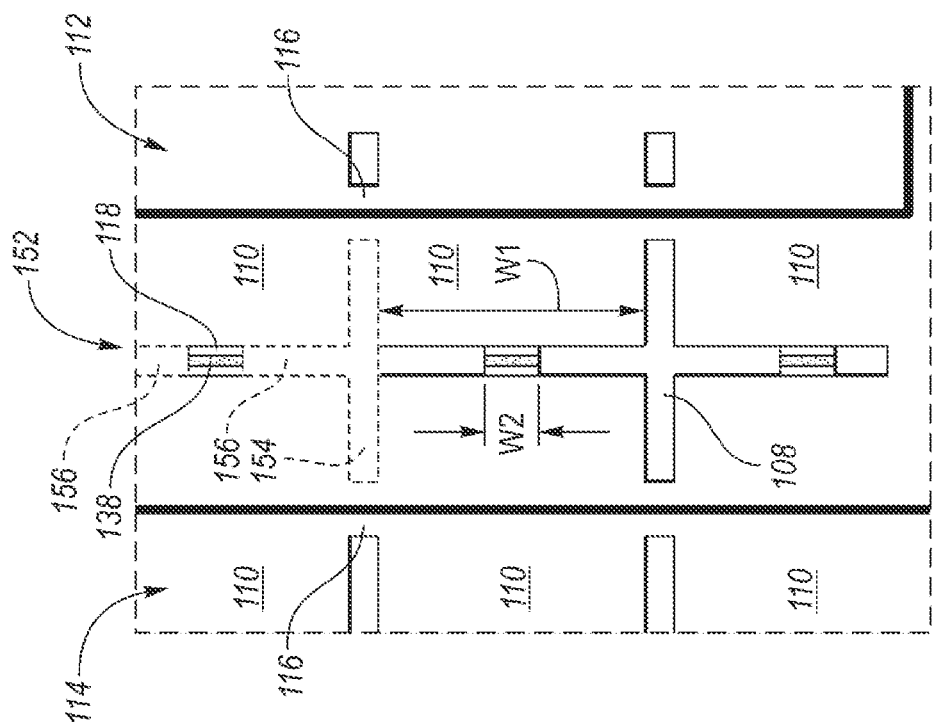

FIG. 4B depicts a detailed plan view of a portion of the first conductive layer 102 taken from region 4B in FIG. 4A. The first interstices 108 may include gaps disposed between the conductive cells 110 and the first and second connecting members 116 and 118. For example, first gaps 154 may extend between first connecting members 116 of the first conductive path 112 and the second conductive path 114 and second gaps 156 may extend between two conductive cells 110 and be adjacent to the second connecting members 118. The first and second gaps 154 and 156 may decrease or prevent portions of the conductive layer 102 from rubbing against each other and causing a crinkling noise. The second number of connecting members 118 may include the second discontinuities 138 that may electrically disconnect adjacent ones of conductive cells 110 that are disposed on either side of the second connecting members 118.

As an example, if the conductive layer was substantially continuous and did not include the first and second gaps 154 and 156, the conductive material or sheet may bend or crease at a certain locations, e.g., at creases or bend points, due to pressure or a change in pressure applied by an occupant. Portions of the conductive material adjacent to the crease or bend points may contact one another and create crinkling noise. The first and second gaps 154 and 156 may decrease the surface area of the first and second conductive layers 102 and 104 to mitigate portions of the conductive layer from contacting one another at or near a crease or bend point.

The first and second gaps 154 and 156 may define a number of profiles of the conductive paths. For example, the conductive cells 110 may have a first width W1 and the first number of connecting members 116 may have a second width W2 that may be less than the first width W1. The second number of connecting members 118 may have a third width W3 that may be substantially equal to the second width W2.

FIG. 4C depicts a detailed plan view of a portion of the first conductive layer 102 taken from region 4B in FIG. 4A. The dashed lines labeled U1 represent a first unit area U1 of the first conductive layer. As an example, the first unit area U1 may include four conductive cells 110 and a number of the first interstices 108. As an example, the conductive material formed by the conductive cells 110, the first connecting members 116, and the second connecting members 118 may form at least 75% of the first unit area. The first interstices 108 may form at least 25% of the first unit area.

Figure 5A:
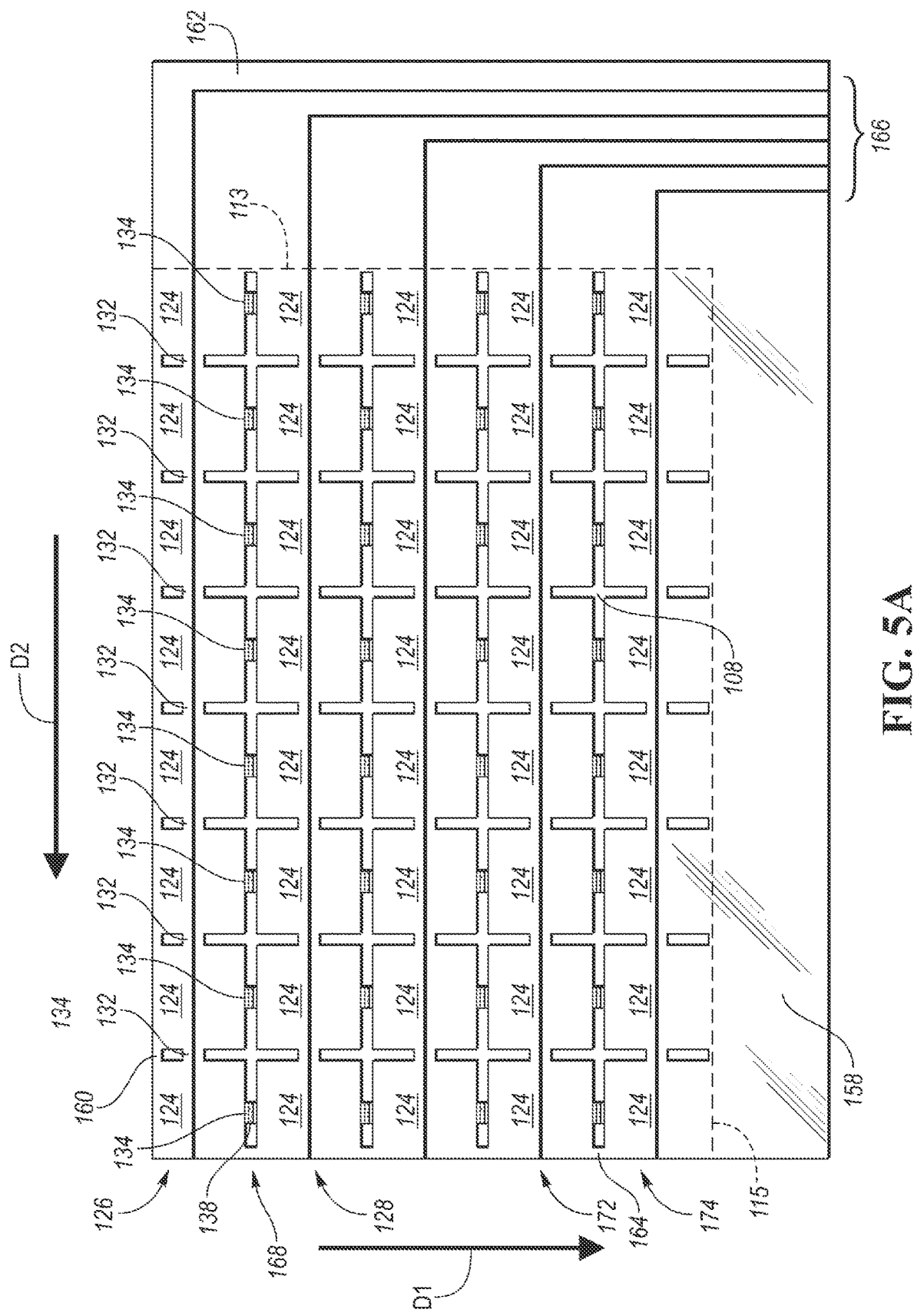
FIG. 5A depicts a schematic view of a portion of an exemplary pressure sensing mat.

FIG. 5A depicts a plan view of the second conductive layer 104. The second conductive layer 104 may include a first edge portion 158 and a second edge portion 160 that may each extend in the second direction. Another pair of edge portions, such as a third edge portion 162 and a fourth edge portion 164 may each extend between the first and second edge portions 158 and 160. Second conductive leads 166 may extend from the first edge portion 158 through the conductive cells 110 to the first edge portion 140. The second conductive leads 166 may provide electricity to the conductive cells 124. End portions of the second conductive leads 166 may be disposed at an outer periphery of the second conductive layer 104 so that the end portions may be connected, e.g., soldered to a connector (not illustrated).

Each of the edge portions 158 through 164 may connect conductive cells 110 that are adjacent to respective edge portions. As an example, the first edge portion 158 and the third edge portion 162 may each have a larger surface area than either of the second edge portion 160 or the fourth edge portion 164. The third conductive path 126 may include the conductive cells 124 adjacent to the second edge portion 160 and aligned with respect to the second direction D2. The fourth conductive path 128 may include the conductive cells 124 adjacent to the third conductive path 126.

The third connecting members 132 may extend in a direction parallel to portions of the conductive leads 148, e.g., in the first direction D1 so that the third connecting members 132 are each disposed between two conductive cells 124. The third connecting members 132 may physically and electrically connect two adjacent ones of conductive cells 124 to form a number of conductive paths such as the third conductive path 126 and the second conductive path 128. The fourth connecting members 134 may extend in a direction that may be substantially transverse to portions of the second conductive leads 166, e.g., in the first direction D1.

The second interstices 122 are represented by the white spaces disposed between the conductive cells 124 and may form a second non-conductive paths 168. As shown, the second interstices 122 may have a cross shape and may be arranged to form a repeating pattern between the third and fourth edge portions 162 and 164. Dashed lines 113 and 115 may represent edges of the conductive cells 124.

Figure 5B:
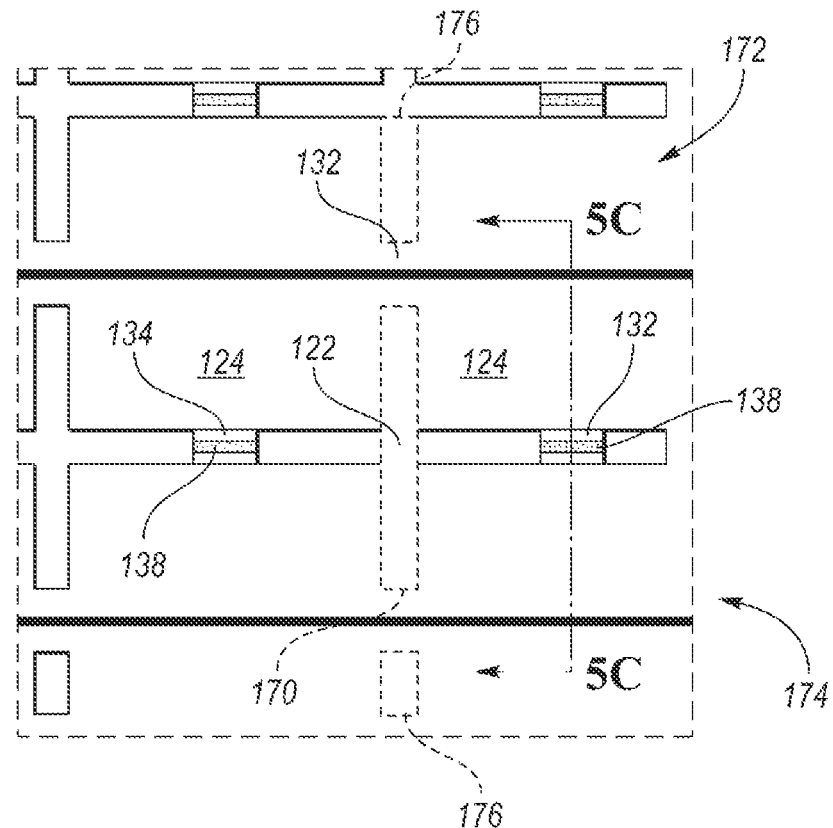
FIG. 5B depicts a detailed schematic view of a portion of FIG. 5A.

FIG. 5B depicts a detailed plan view of a portion of the second conductive layer 104 taken from a region of FIG. 5A. The second interstices 122 may define a number of gaps that may be disposed between the conductive cells 124 and the third and fourth connecting members 132 and 134. For example, third gaps 170 may extend between the third connecting members 132 of a fifth conductive path 172 and a sixth conductive path 174 and fourth gaps 176 may extend between two conductive cells 110 and be adjacent to the second connecting members 118.

Figure 5C:
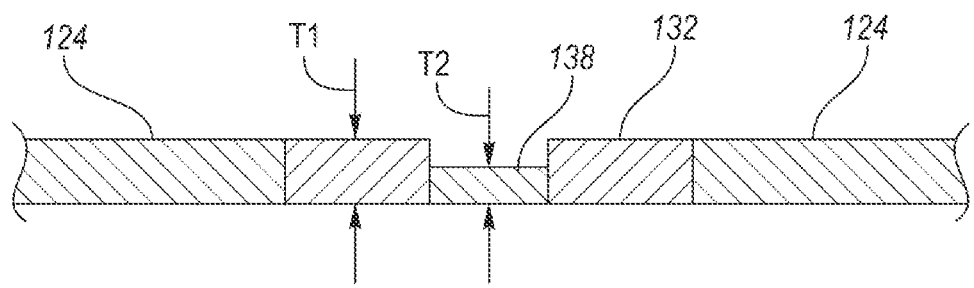
FIG. 5C depicts a cross-sectional view taken along the lines 5C in FIG. 5B.

FIG. 5C depicts a cross-sectional view taken along the lines 5C in FIG. 5A. The fourth connecting members 134 may have a first thickness t1 and the second discontinuities 138 may have a second thickness t2. In one or more embodiments, the second thickness t2 may be less than the first thickness t1. The second discontinuities 138 may be formed by melting or ablating at least a portion of the fourth connecting members 132. As another example, the second discontinuities 138 may be formed by etching at least a portion of the fourth discontinuities 132. The conductive cells 124 may have a thickness that is substantially equal to the first thickness t1. While the fourth connecting members 132 and second discontinuities 138 are described and depicted here, the aforementioned description applies to the second connecting members 118 and the second discontinuities 138.

FIG. 6 depicts a fragmented, exploded, perspective view of a portion of an exemplary pressure sensing mat such as one of the first conductive layer 102 or the second conductive layer 104. In one or more embodiments, one or more of the first and second conductive layers 102 and 104 may include plastic laminations 150 that may be disposed on a first side, second side, or both sides of the laminated copper material 178. The plastic laminations 150 may include one or more polymeric materials such as polyethylene (PE) or polyethylene terephthalate (PET). As an example, the PET layer 180 may be disposed between one side of the laminated copper material 178 and a layer of the PE layer 182. The plastic laminations 150 may be melted to cover or enclose the copper material 178.

Figure 7:
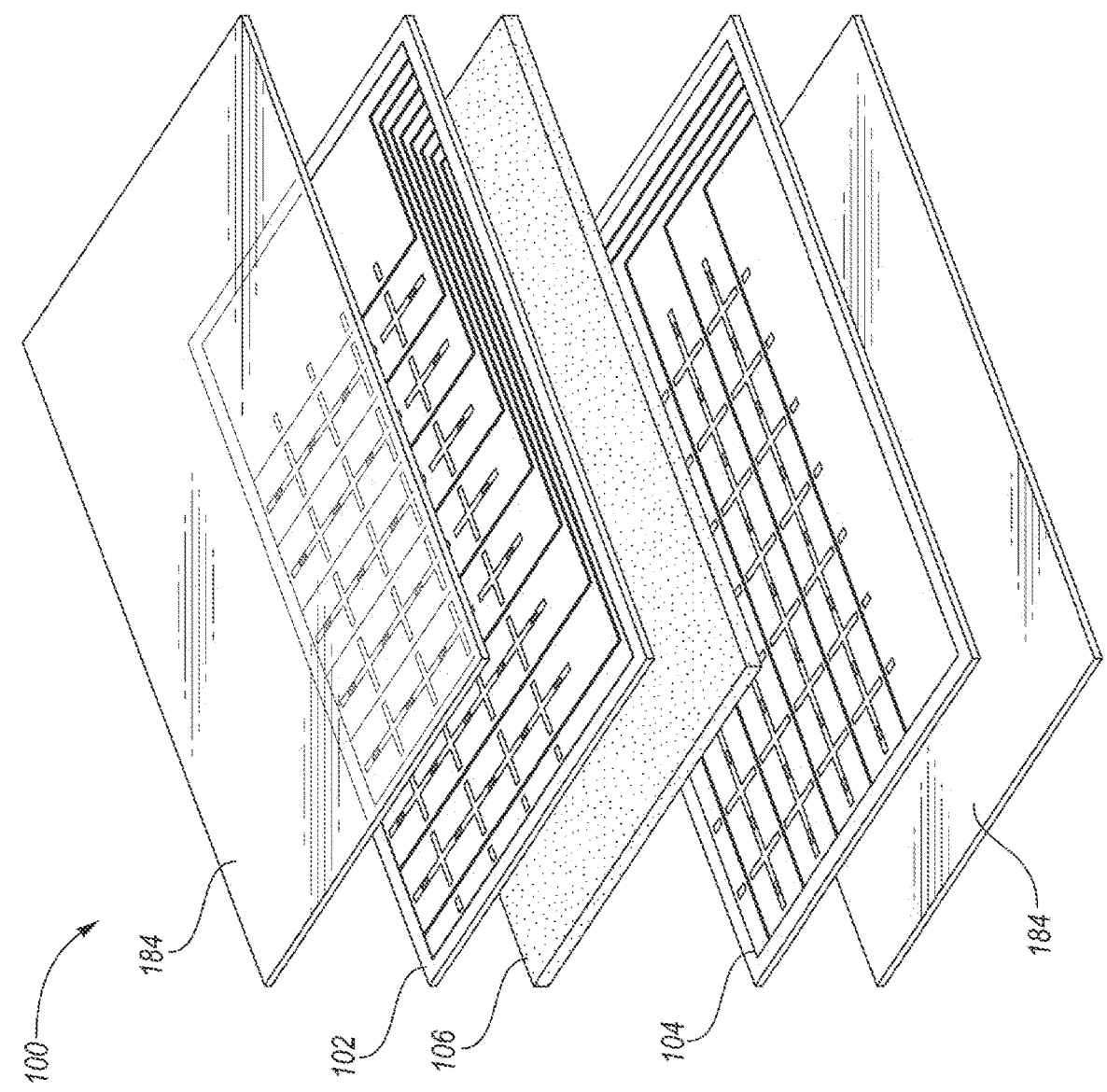
FIG. 7 depicts a fragmented, exploded, and perspective schematic view of an exemplary pressure sensing mat.

FIG. 7 depicts a fragmented, exploded, and perspective view of pressure sensing mat 100. As one example, the pressure sensing mat 100 may include one or more covers 184 that may be fixed directly to either the first conductive layer 102 or the second conductive layer 104, or both. The cover 184 may be fixed to the first and second conductive layers 102 and 104 by an adhesive such as double-sided tape (DST), liquid adhesive, e.g., glue that may be applied as a spray or a number of beads. The adhesive may be applied to outer portions of the cover 184 or the first and second conductive layers 102 and 104 or to inner portions of the same.

The covers 184 may be formed of a fabric or a polymeric material. As one example, the material of the covers 184 may be formed of a water-resistant material that may be configured to prevent a liquid from penetrating through the cover 184 to the first and second conductive layers 102 and 104. If water or other liquid penetrates the cover 184, the liquid may cause a short of one or more of the capacitors 136. As one example, the cover 184 may be composed of polytetrafluoroethylene (PTFE) or expanded PTFE. A cover 184 made from a water-resistant material may be useful when the pressure sensing mat 100 is used by burn patients or within an operating room environment where liquids from the patient's body or otherwise may be deposited on the cover 184.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pressure sensing mat comprising:
   a first conductive layer including a first plurality of spaced apart conductive paths and a first plurality of non-conductive paths therebetween and defining a plurality of gaps in the first plurality of non-conductive paths, the first plurality of gaps having a first repeating pattern of a cross shape, the first plurality of spaced apart conductive paths and the first plurality of non-conductive paths extending in a first direction;
   a second conductive layer including a second plurality of spaced apart conductive paths and a second plurality of non-conductive paths therebetween and defining a second plurality of gaps in the second plurality of non-conductive paths, the second plurality of gaps having a second repeating pattern, the second plurality of spaced apart conductive paths and the second plurality of non-conductive paths extending in a second direction different than the first direction; and
   an insulative layer disposed between the first and second conductive layers.

2. The pressure sensing mat of claim 1, wherein the first plurality of gaps partially defines a first profile of each of the first plurality of spaced apart conductive paths, and the second plurality of gaps partially defines a second profile of each of the second plurality of spaced apart conductive paths.

3. The pressure sensing mat of claim 1, wherein the first and second repeating patterns are the same repeating pattern.

4. The pressure sensing mat of claim 1, wherein the first conductive layer includes a first non-conductive sheet and a first conductive sheet lying along the first non-conductive sheet.

5. The pressure sensing mat of claim 4, wherein the first conductive sheet includes a plurality of non-conductive regions and a plurality of conductive regions, wherein the first non-conductive sheet physically connects the plurality of non-conductive regions to the plurality of conductive regions.

6. The pressure sensing mat of claim 5, the first plurality of conductive regions and the first plurality of non-conductive regions are physically connected and electrically disconnected.

7. A pressure sensing mat comprising:
   a first conductive layer defining a first plurality of interstices partially defining,
      a first array of conductive cells arranged to form portions of a first conductive path and a second conductive path each extending in a first direction,
      a first plurality of connecting members extending in the first direction, wherein the first plurality of connecting members and the first array of conductive cells collectively form the first conductive path and the second conductive path,
      a second plurality of connecting members extending in a second direction and disposed between the conductive cells of the first conductive path and the first array of conductive cells of the second conductive path, wherein the second plurality of connecting members are configured to electrically disconnect the conductive cells of the first conductive path and the conductive cells of the second conductive path;
   a second conductive layer defining a second plurality of interstices partially defining,
      a second array of conductive cells arranged to form portions of a third conductive path and a fourth conductive path each extending in the second direction,
      a third plurality of connecting members extending in the second direction, wherein the third plurality of connecting members and second array of conductive cells collectively form the third conductive path and the fourth conductive path,
      a fourth plurality of connecting members extending in the first direction and disposed between the conductive cells of the third conductive path and the conductive cells of the fourth conductive path, wherein the fourth plurality of connecting members are configured to electrically disconnect the conductive cells of the third conductive path and the conductive cells of the fourth conductive path; and an insulative layer disposed between the first conductive layer and the second conductive layer.

8. The pressure sensing mat of claim 7, wherein the first array of conductive cells, the first plurality of connecting members, and the second plurality of connecting members are each formed of a conductive material, wherein at least 75% of a first area of the first conductive layer is composed of the conductive material.

9. The pressure sensing mat of claim 8, wherein at least 25% of the first area is composed of the first plurality of interstices.

10. The pressure sensing mat of claim 7, wherein the first plurality of interstices has a first repeating pattern and the second plurality of interstices has a second repeating pattern.

11. The pressure sensing mat of claim 10, wherein the first plurality of interstices and the second plurality of interstices are substantially aligned with one another.

12. The pressure sensing mat of claim 7, wherein a first conductive cell of the first array of conductive cells has a first width and a first connecting member of the first plurality of connecting members has a second width less than the first width.

13. The pressure sensing mat of claim 12, wherein a first connecting member of the second plurality of connecting members has a third width substantially equal to the second width.

14. A pressure sensing mat comprising:
a first conductive layer defining a first plurality of interstices forming,
   a first array of conductive cells arranged to form portions of a first conductive path and a second conductive path each extending in a first direction,
   a first plurality of connecting members extending in the first direction, wherein the first plurality of connecting members and the first array of conductive cells collectively form the first conductive path and the second conductive path,
   a second plurality of connecting members extending in a second direction and disposed between the conductive cells of the first conductive path and the first array of conductive cells of the second conductive path, wherein the second plurality of connecting members include a first plurality of discontinuities to electrically disconnect the conductive cells of the first conductive path and the conductive cells of the second conductive path;
a second conductive layer defining a second plurality of interstices forming,
   a second array of conductive cells arranged to form portions of a third conductive path and a fourth conductive path each extending in the second direction,
   a third plurality of connecting members extending in the second direction, wherein the third plurality of connecting members and second array of conductive cells collectively form the third conductive path and the fourth conductive path,
   a fourth plurality of connecting members extending in the first direction and disposed between the conductive cells of the third conductive path and the conductive cells of the fourth conductive path, wherein the fourth plurality of connecting members include a second plurality of discontinuities to electrically disconnect the conductive cells of the third conductive path and the conductive cells of the fourth conductive path; and
an insulative layer disposed between the first conductive layer and the second conductive layer.

15. The pressure sensing mat of claim 14, wherein the second plurality of connecting members has a first thickness and the first plurality of discontinuities has a second thickness, wherein the second thickness is less than the first thickness.

16. The pressure sensing mat of claim 14, wherein the first plurality of discontinuities is formed by melting or ablating at least a portion of the first plurality of discontinuities.

17. The pressure sensing mat of claim 14, wherein the first plurality of discontinuities is formed by etching at least a portion of the first plurality of discontinuities.

* * * * *